(12) United States Patent
Sebastian et al.

(10) Patent No.: US 10,366,641 B2
(45) Date of Patent: Jul. 30, 2019

(54) PRODUCT DISPLAY SYSTEMS AND RELATED METHODS

(71) Applicant: R.J. Reynolds Tobacco Company, Winston-Salem, NC (US)

(72) Inventors: Andries Don Sebastian, Clemmons, NC (US); Michael F. Davis, Clemmons, NC (US)

(73) Assignee: R.J. Reynolds Tobacco Company, Winston-Salem, NC (US)

( * ) Notice: Subject to any disclaimer, the term of this patent is extended or adjusted under 35 U.S.C. 154(b) by 126 days.

(21) Appl. No.: 15/386,165

(22) Filed: Dec. 21, 2016

(65) Prior Publication Data

US 2018/0174500 A1 Jun. 21, 2018

(51) Int. Cl.
A47F 11/06 (2006.01)
G09F 27/00 (2006.01)
G06Q 30/02 (2012.01)

(52) U.S. Cl.
CPC ............ *G09F 27/005* (2013.01); *A47F 11/06* (2013.01); *G06Q 30/0251* (2013.01); *A47B 2220/0075* (2013.01)

(58) Field of Classification Search
CPC ................................. G09F 27/005; G09F 5/00
See application file for complete search history.

(56) References Cited

U.S. PATENT DOCUMENTS

| | | |
|---|---|---|
| 4,735,217 A | 4/1988 | Gerth et al. |
| 4,793,365 A | 12/1988 | Sensabaugh, Jr. et al. |
| 4,922,901 A | 5/1990 | Brooks et al. |
| 4,947,874 A | 8/1990 | Brooks et al. |
| 4,947,875 A | 8/1990 | Brooks et al. |
| 5,060,671 A | 10/1991 | Counts et al. |
| 5,093,894 A | 3/1992 | Deevi et al. |
| 5,101,839 A | 4/1992 | Jakob et al. |
| 5,154,192 A | 10/1992 | Sprinkel et al. |
| 5,224,498 A | 7/1993 | Deevi et al. |

(Continued)

FOREIGN PATENT DOCUMENTS

| | | |
|---|---|---|
| WO | WO 98/54556 | 12/1998 |
| WO | WO 2010/003480 | 1/2010 |

(Continued)

OTHER PUBLICATIONS

Chemical and Biological Studies on New Cigarette Prototypes that Heat Instead of Burn Tobacco, R.J. Reynolds Tobacco Company Monograph, 1988, pp. 43-72.

(Continued)

*Primary Examiner* — Joanne Silbermann
(74) *Attorney, Agent, or Firm* — Womble Bond Dickinson (US) LLP (57) ABSTRACT

Product display systems are provided. The product display system may include a product display assembly. The product display system may also include a retail product positioned in proximity to the product display assembly. The product display system may further include a power source configured to output electrical current. At least one of the product display assembly and the retail product may include a shape-memory alloy. The shape-memory alloy may be configured to change from a first shape to a second shape in response to heat produced from electrical current provided by the power source.

17 Claims, 4 Drawing Sheets

(56) References Cited

U.S. PATENT DOCUMENTS

| | | |
|---|---|---|
| 5,228,460 A | 7/1993 | Sprinkel et al. |
| 5,249,586 A | 10/1993 | Morgan et al. |
| 5,261,424 A | 11/1993 | Sprinkel, Jr. |
| 5,322,075 A | 6/1994 | Deevi et al. |
| 5,353,813 A | 10/1994 | Deevi et al. |
| 5,372,148 A | 12/1994 | McCafferty et al. |
| 5,468,936 A | 11/1995 | Deevi et al. |
| 5,498,850 A | 3/1996 | Das |
| 5,498,855 A | 3/1996 | Deevi et al. |
| 5,530,225 A | 6/1996 | Hajaligol |
| 5,573,692 A | 11/1996 | Das et al. |
| 5,591,368 A | 1/1997 | Fleischhauer et al. |
| 5,659,656 A | 8/1997 | Das |
| 5,665,262 A | 9/1997 | Hajaligol et al. |
| 5,666,977 A | 9/1997 | Higgins et al. |
| 5,934,289 A | 8/1999 | Watkins et al. |
| 5,954,979 A | 9/1999 | Counts et al. |
| 5,967,148 A | 10/1999 | Harris et al. |
| 6,040,560 A | 3/2000 | Fleischhauer et al. |
| 6,053,176 A | 4/2000 | Adams et al. |
| 6,164,287 A | 12/2000 | White |
| 6,196,218 B1 | 3/2001 | Voges |
| 6,772,756 B2 | 8/2004 | Shayan |
| 6,803,545 B2 | 10/2004 | Blake et al. |
| 6,810,883 B2 | 11/2004 | Felter et al. |
| 6,854,461 B2 | 2/2005 | Nichols et al. |
| 6,896,145 B2 * | 5/2005 | Higgins ............... A47F 5/0018 211/1 |
| 7,040,314 B2 | 5/2006 | Nguyen et al. |
| 7,293,565 B2 | 11/2007 | Griffin et al. |
| 7,356,952 B2 * | 4/2008 | Sweeney ............ G06Q 10/087 40/446 |
| 7,513,253 B2 | 4/2009 | Kobayashi et al. |
| 7,726,320 B2 | 6/2010 | Robinson et al. |
| 7,832,410 B2 | 11/2010 | Hon |
| 7,896,006 B2 | 3/2011 | Hamano et al. |
| 8,156,944 B2 | 4/2012 | Han |
| 8,375,957 B2 | 2/2013 | Hon |
| 8,402,976 B2 | 3/2013 | Fernando et al. |
| 8,689,804 B2 | 4/2014 | Fernando et al. |
| 8,794,231 B2 | 8/2014 | Thorens et al. |
| 8,851,083 B2 | 10/2014 | Oglesby et al. |
| 8,881,737 B2 | 11/2014 | Collett et al. |
| 8,910,639 B2 | 12/2014 | Chang et al. |
| 8,915,254 B2 | 12/2014 | Monsees et al. |
| 8,925,555 B2 | 1/2015 | Monsees et al. |
| 9,072,320 B2 | 7/2015 | Coatney et al. |
| 9,210,738 B2 | 12/2015 | Ward et al. |
| 9,220,302 B2 | 12/2015 | DePiano et al. |
| 9,277,770 B2 | 3/2016 | DePiano et al. |
| 9,316,212 B2 | 4/2016 | Browne et al. |
| 9,423,152 B2 | 8/2016 | Ampolini et al. |
| 2005/0270280 A1 * | 12/2005 | Riback .................... G09F 27/00 345/204 |
| 2006/0196518 A1 | 9/2006 | Hon |
| 2009/0188490 A1 | 7/2009 | Han |
| 2010/0024834 A1 | 2/2010 | Oglesby et al. |
| 2010/0028766 A1 | 2/2010 | Peckerar et al. |
| 2010/0307518 A1 | 12/2010 | Wang |
| 2013/0255702 A1 | 10/2013 | Griffith, Jr. et al. |
| 2013/0298548 A1 * | 11/2013 | Chen ...................... B23P 11/00 60/527 |
| 2014/0000638 A1 | 1/2014 | Sebastian et al. |
| 2014/0096781 A1 | 4/2014 | Sears et al. |
| 2014/0261495 A1 | 9/2014 | Novak, III et al. |
| 2014/0270729 A1 | 9/2014 | DePiano et al. |
| 2014/0314999 A1 * | 10/2014 | Song ...................... G06F 1/1601 428/174 |
| 2014/0343854 A1 * | 11/2014 | Wollard ................ G09F 13/005 702/3 |
| 2015/0093559 A1 * | 4/2015 | Baer ...................... B32B 27/08 428/216 |
| 2015/0114409 A1 | 4/2015 | Brammer et al. |
| 2015/0117841 A1 | 4/2015 | Brammer et al. |
| 2015/0117842 A1 | 4/2015 | Brammer et al. |
| 2015/0216232 A1 | 8/2015 | Bless et al. |
| 2015/0320113 A1 | 11/2015 | Stebbins et al. |
| 2015/0321787 A1 | 11/2015 | Stebbins et al. |
| 2016/0349543 A1 | 12/2016 | Rogers |

FOREIGN PATENT DOCUMENTS

| | | |
|---|---|---|
| WO | WO 2010/091593 | 8/2010 |
| WO | WO 2013/089551 | 6/2013 |

OTHER PUBLICATIONS

Jani et al., "A Review of Shape Memory Alloy Research, Applications and Opportunities," Materials and Design, 2014, vol. 56, pp. 1078-1113.

Borden, "Shape-Memory Alloys: Forming a Tight Fit," Mechanical Engineering, Oct. 1991, pp. 67-72.

\* cited by examiner

PRODUCT DISPLAY SYSTEMS AND RELATED METHODS

FIELD OF THE DISCLOSURE

The present disclosure relates to product display systems and related methods. The product display systems may be configured to display retail products including a substance made or derived from tobacco, or that otherwise incorporate tobacco, and are intended for human consumption in a smokeless form.

BACKGROUND OF THE DISCLOSURE

Various types of product display systems that are intended to showcase products sold at retail stores are known in the art. Such product display systems and retail products are often characterized by an advertising or promotional mechanism that is configured to attract consumers to the product display system, as opposed to competitor's products that are often showcased nearby. For example, conventional advertising mechanisms such as animation, motion and sound, lights, music tones, bright colors, etc., may be employed in order to gain consumers attention.

As a result of competing products being sold in close proximity to one another, conventional methods employed to attract a consumer's attention may no longer work in a satisfactory manner to draw the consumer's attention to a specific product. For this reason, product manufacturers, distributors, and retailers are searching for improved methods and mechanisms for gaining a consumer's attention in retail establishments.

Accordingly, it may be desirable to provide improved product display systems and/or retail products that have a unique advertising mechanism in order to better attract consumers to a specific product display system and/or retail product displayed thereby.

BRIEF SUMMARY OF THE DISCLOSURE

The present disclosure relates to a product display system including a product display assembly and a retail product having a shape-memory alloy incorporated therewith, and a related method. In one aspect, a product display system is provided. The product display system may include a product display assembly. The product display system may also include a retail product positioned in proximity to the product display assembly. The product display system may further include a power source configured to output electrical current. At least one of the product display assembly and the retail product may include a shape-memory alloy. The shape-memory alloy may be configured to change from a first shape to a second shape in response to heat produced from electrical current provided by the power source.

In some embodiments, the power source may include a light-to-power conversion mechanism configured to receive light and output electrical current. The product display system may further include a current storage mechanism configured to store electrical current received from the light-to-power mechanism. The power source may also include a battery.

In some embodiments, the product display system may further include a controller configured to selectively control heating of the shape-memory alloy. The product display system may further include a sensor configured to detect a human presence, the controller being configured to cause heating of the shape-memory alloy in response to detection of the human presence. The sensor may be configured to detect one or more of motion and sound.

In some embodiments, the shape-memory alloy may include a nickel titanium (NiTi) alloy. The shape-memory alloy, in the first shape, may be substantially coplanar with a surface of at least one of the product display assembly and the retail product and, in the second shape, may be non-coplanar with the surface. At least one of the first shape and the second shape of the shape-memory alloy may define a brand name, a logo, a text, a graphic, or a combination thereof.

In some embodiments, at least one of the product display assembly and the retail product may include a heating element configured to receive electrical current from the power source and to heat the shape-memory alloy to at least an austenite start temperature in response thereto. The shape-memory alloy may be configured to change to the second shape from the first shape in response to being heated to a temperature approximately between the austenite start temperature and an austenite finish temperature. The shape-memory alloy may be configured to return to the first shape from the second shape in response to cooling to at least a martensite start temperature.

In an additional aspect, a product display method is provided. The method may include positioning a retail product in proximity to a product display assembly. The method may also include outputting electrical current from a power source to heat a shape-memory alloy of at least one of the product display assembly and the retail product. The method may still further include changing the shape-memory alloy from a first shape to a second shape in response to being heated.

In some embodiments, outputting the electrical current from the power source to heat the shape-memory alloy may include selectively controlling, by a controller, heating of the shape-memory alloy. The shape-memory alloy may include a NiTi alloy. The shape-memory alloy, in the first shape, may be substantially coplanar with a surface of at least one of the product display assembly and the retail product and, in the second shape, may be non-coplanar with the surface.

In some embodiments, outputting the electrical current from the power source to heat the shape-memory alloy may include heating, by a heating element of at least one of the product display assembly and the retail product, the shape-memory alloy to an austenite start temperature in response to receipt of electrical current from the power source. Changing the shape-memory alloy from the first shape to the second shape in response to being heated may include changing, of the shape-memory alloy, to the second shape from the first shape in response to being heated to a temperature approximately between the austenite start temperature and an austenite finish temperature. The method may further include returning, of the shape-memory alloy, to the first shape from the second shape in response to cooling to at least a martensite start temperature.

These and other features, aspects, and advantages of the disclosure will be apparent from a reading of the following detailed description together with the accompanying drawings, which are briefly described below.

BRIEF DESCRIPTION OF THE DRAWINGS

Having thus described the disclosure in general terms, reference will now be made to the accompanying drawings, which are not necessarily drawn to scale, and wherein:

DETAILED DESCRIPTION OF THE DISCLOSURE

The present disclosure now will be described more fully hereinafter with reference to certain preferred aspects. These aspects are provided so that this disclosure will be thorough and complete, and will fully convey the scope of the disclosure to those skilled in the art. Indeed, the disclosure may be embodied in many different forms and should not be construed as limited to the aspects set forth herein; rather, these aspects are provided so that this disclosure will satisfy applicable legal requirements. As used in the specification, and in the appended claims, the singular forms "a", "an", "the", include plural referents unless the context clearly dictates otherwise.

Various products are sold in retail establishments. Such stores often carry a wide variety of types and brands of products from competing manufacturers. By way of example, such stores also often carry tobacco products. The retail market for tobacco products is extremely competitive and manufacturers generally try and differentiate their products using any number of strategies. One of those strategies includes their advertising and marketing tactics; especially their display assemblies in a bricks and mortar retail establishment. In this regard, by way of example, U.S. App. Pub. Nos. 2015/0321787, and 2015/0320113, both to Stebbins et al. and each incorporated herein by reference in their entireties, disclose convertible packaging devices which may be employed to house one or more products during shipment, and display the products at a retail store upon conversion of the devices to a display configuration at the retail store. U.S. Pat. No. 9,072,320 to Coatney et al., discloses promotional packaging configured to hold first and second tobacco products, which may differ from one another, in first and second compartments, and is incorporated herein by reference in its entirety. Thereby, product display systems in a bricks and mortar retail establishment may play an important role in dictating sales of the products associated therewith as a means for distinguishing a certain type and brand of retail product from another.

However, improved systems and methods for displaying retail products may be desirable. More particularly, a product display assembly and/or retail product packaging that utilizes a unique advertising mechanism may be desirable to distinguish a brand or product from competitors. Accordingly, as disclosed herein, product display systems and/or retail products include at least one portion that comprises a shape-memory alloy. The shape-memory alloy of the product display systems and/or retail products is configured to change from a first shape to a second shape and may define a brand name, a logo, a text, a graphic, or a combination thereof, in response to a change in temperature of the alloy. In this manner, the product display systems and methods disclosed herein are improved by way of the incorporation of a shape-memory alloy that provides a unique advertising mechanism.

Figure 1A:
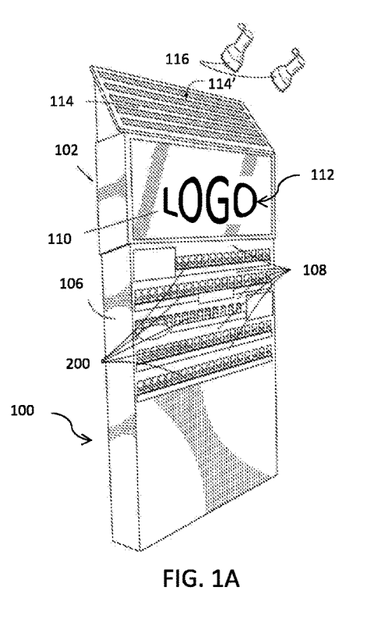
FIG. 1A illustrates a perspective view of a product display system including a product display assembly and a retail product, wherein a logo of the product display assembly comprises a shape-memory alloy in a first shape according to an example embodiment of the present disclosure.
Figure 1B:
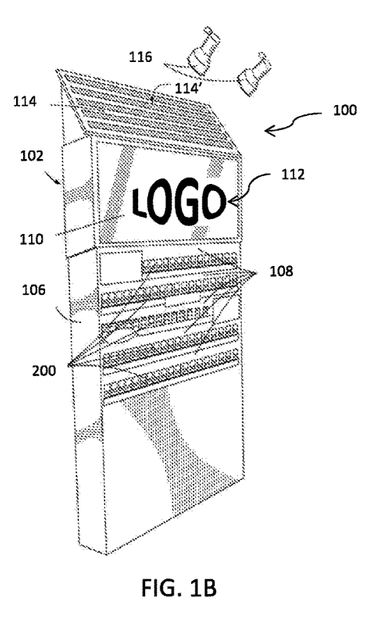
FIG. 1B illustrates a perspective view of the product display system of FIG. 1B, wherein the shape-memory alloy of the logo of the product display assembly is in a second shape.

In this regard, FIGS. 1A-1B show an embodiment of a product display system, generally designated 100, which is representative of the present disclosure. The product display system 100 includes a product display assembly 102 and at least one product 200. The product(s) 200 are positioned in proximity to the product display assembly 102, such that the product display assembly 102 is configured to support, hold, contain, or otherwise position the one or more products 200. Thus, the product display assembly 102 supports the products 200 such that the products are at least partially externally viewable, accessible, and removable therefrom. In this regard, the products 200 are offered for sale from the product display assembly 102.

The product display assembly 102, according to an example embodiment of the present disclosure, comprises a rack 106. The rack 106 includes one or more shelves 108. The shelves 108 are configured to support the products 200 such that the products are at least partially exposed, and thereby visible to a consumer and accessible for removal therefrom. As further illustrated, in some embodiments, the rack 106 includes one or more panels 110 configured to display logos, brand names or other product identifiers, images, pricing information, or various other such information and/or graphics. Such panels 110 thereby assist in gaining consumer attention.

In some aspects, the logos, brand names or other product identifiers, images, pricing information, or various other such information and/or graphics comprise(s) a shape-memory alloy, which is configured to change from a first shape to a second shape in response to heat produced from electrical current provided by a power source.

Shape-memory alloys generally refer to a group of metallic materials that demonstrate the ability to return to some previously defined shape or size when subjected to an appropriate thermal stimulus. Shape-memory alloys are capable of undergoing phase transitions in which their yield strength, stiffness, dimension and/or shape are altered as a function of temperature. Generally, in the low temperature, or martensite phase, shape-memory alloys can be plastically deformed and upon exposure to some higher temperature will transform to an austenite phase, or parent phase, returning to their shape prior to the deformation.

Shape-memory alloys exist in several different temperature-dependent phases. The most commonly utilized of these phases are the so-called martensite and austenite phases. The "martensite phase" generally refers to the more deformable, lower temperature phase whereas the "austenite phase" generally refers to the more rigid, higher temperature phase. When the shape-memory alloy is in the martensite phase and is heated, it begins to change into the austenite phase. The temperature at which this phenomenon starts is often referred to as austenite start temperature ($A_s$). The temperature at which this phenomenon is complete is called the austenite finish temperature ($A_f$).

When the shape-memory alloy is in the austenite phase and is cooled, it begins to change into the martensite phase, and the temperature at which this phenomenon starts is referred to as the martensite start temperature ($M_s$). The temperature at which austenite finishes transforming to martensite is called the martensite finish temperature ($M_f$). Generally, the shape-memory alloys are softer and more easily deformable in their martensitic phase and are harder, stiffer, and/or more rigid in the austenitic phase.

Shape-memory alloys can exhibit a one-way shape-memory effect, an intrinsic two-way effect, or an extrinsic two-way shape-memory effect depending on the alloy composition and processing history. Annealed shape-memory alloys typically only exhibit the one-way shape-memory effect. Sufficient heating subsequent to low-temperature deformation of the shape-memory material will induce the martensite to austenite type transition, and the material will recover the original, annealed shape. Hence, one-way shape-memory effects are only observed upon heating. Active materials comprising shape-memory alloy compositions that exhibit one-way memory effects do not automatically reform, and require an external mechanical force to return the shape to its previous configuration.

Intrinsic and extrinsic two-way shape-memory materials are characterized by a shape transition (i.e., from a first shape to a second shape) both upon heating from the martensite phase to the austenite phase, as well as an additional shape transition (i.e., from the second shape to the first shape) upon cooling from the austenite phase back to the martensite phase. With regard to the present disclosure, the shape-memory alloys described herein exhibit a two-way shape-memory effect. Active materials that exhibit an intrinsic shape-memory effect are fabricated from a shape-memory alloy composition that will cause the active materials to automatically reform themselves as a result of the above noted phase transformations. Intrinsic two-way shape-memory behavior must be induced in the shape-memory material through processing. Such procedures include extreme deformation of the material while in the martensite phase, heating-cooling under constraint or load, or surface modification such as laser annealing, polishing, or shot-peening. Once the material has been trained to exhibit the two-way shape-memory effect, the shape change between the low and high temperature states is generally reversible and persists through a high number of thermal cycles. In contrast, active materials that exhibit the extrinsic two-way shape-memory effects are composite or multi-component materials that combine a shape-memory alloy composition that exhibits a one-way effect with another element that provides a restoring force to reform the original shape.

The temperature at which the shape-memory alloy remembers its high temperature form when heated is adjustable by slight changes in the composition of the alloy and through heat treatment. In nickel-titanium shape-memory alloys, for instance, it is changeable from above about 100° C. to below about −100° C. The shape recovery process occurs over a range of just a few degrees and the start or finish of the transformation is controllable to within a degree or two depending on the desired application and alloy composition. The mechanical properties of the shape-memory alloy vary greatly over the temperature range spanning their transformation, typically providing the system with shape-memory effects, superelastic effects, and high damping capacity.

Suitable shape-memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape-memory effect, e.g., change in shape orientation, damping capacity, and the like.

Shape-memory alloys exhibit a modulus increase of 2.5 times and a dimensional change of up to 8% (depending on the amount of pre-strain) when heated above their martensite to austenite phase transition temperature. Stress induced phase changes in shape-memory alloys known as superelasticity (or pseudoelasticity) refer to the ability of shape-memory alloys to return to its original shape upon unloading after a substantial deformation in a two-way manner. Application of sufficient stress when shape-memory alloys are in their austenitic phase will cause them to change to their lower modulus martensitic phase in which they can exhibit up to 8% of superelastic deformation. Removal of the applied stress will cause the shape-memory alloys to switch back to their austenitic phase in so doing recovering their starting shape and higher modulus, and dissipating energy. More particularly, the application of an externally applied stress causes martensite to form at temperatures higher than the martensite start temperature $M_s$. The macroscopic deformation is accommodated by the formation of martensite. When the stress is released, the martensite phase transforms back into the austenite phase and the shape-memory alloys return back to their original shape. Superelastic shape-memory alloys can be strained several times more than ordinary metal alloys without being permanently plastically deformed, however, this is only observed over a specific temperature range, with the largest ability to recover occurring close to the austenite finish temperature $A_f$. Additional information regarding shape-memory alloys is provided in U.S. Pat. No. 9,316,212 to Browne et al., which is incorporated herein by reference in its entirety. Example embodiments of shape-memory alloys are commercially available from Modti, Inc. of Joensuu, Finland.

Accordingly, in reference to the present disclosure, the shape-memory alloy, in some embodiments, provides a two-way shape-memory effect. Thus, the shape-memory alloy is configured to change shape in response to heat produced from electrical current provided by a power source from a first shape to a second shape (i.e., from the martensite phase to the austenite phase) and return to the first shape from the second shape (from the austenite phase back to the martensite phase) upon cooling. Preferably, in some embodiments, the shape-memory alloy comprises a nickel-titanium alloy having the following properties: an austenite finish temperature $A_f$ of between about 70 degrees Celsius and about 80 degrees Celsius, an austenite start temperature $A_s$ of between about 50 degrees Celsius and about 60 degrees Celsius, a martensite start temperature $M_s$ of between about 15 degrees Celsius and about 20 degrees Celsius, and a martensite finish temperature $M_f$ of between about 40 degrees Celsius and about 50 degrees Celsius.

In reference to FIG. 1A, the shape-memory alloy is configured as a logo 112, in a first shape, and disposed on the panel 110. In the first shape, the logo 112 is substantially coplanar with the panel 110. More particularly, the logo 112 appears to be integrated with the panel 110 when viewed by a consumer from a front or side of the panel 110. Conversely, and in reference to FIG. 1B, the logo 112 is in a second shape. In the second shape, the logo 112 is substantially non-coplanar with the panel 110. More particularly, the logo 112 projects outwardly from a surrounding portion of the panel 110 when viewed by a consumer from a front or side of the panel 110. Thus, in embodiments in which the product display assembly 102 includes the logo 112 comprising a shape-memory alloy, the logo 112 is configured to attract attention to the product display system 100 as a whole by changing from the first shape to the second shape. Additionally or alternatively, the logo 112 is configured to draw a consumer's attention directly to the one or more retail products packaged in a retail product package, generally designated 200, due to inclusion therein.

Figure 2A:
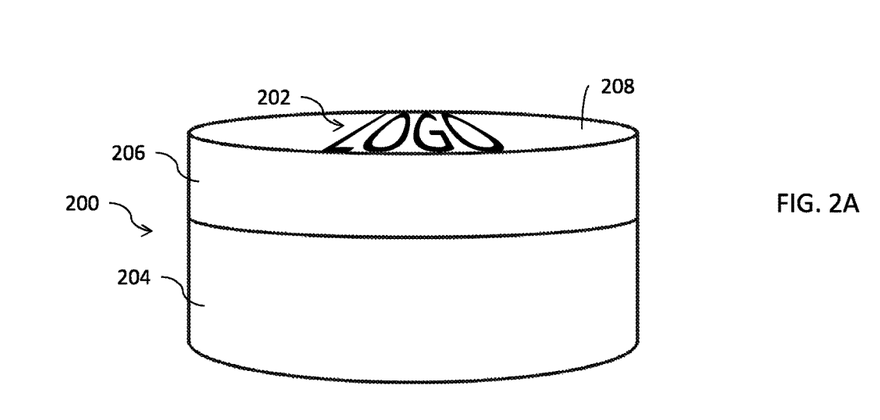
FIG. 2A illustrates a perspective view of a retail product, wherein a logo of the retail product comprises a shape-memory alloy in a first shape according to an example embodiment of the present disclosure.
Figure 2B:
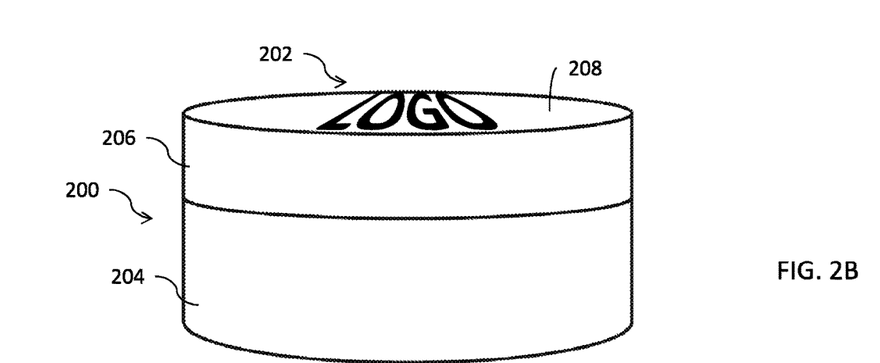
FIG. 2B illustrates a perspective view of the retail product of FIG. 2A, wherein the shape-memory alloy of the logo of the retail product is in a second shape.

In a further embodiment, one or more of the retail products 200 include logos, brand names or other product identifiers, images, pricing information, or various other such information and/or graphics comprising a shape-memory alloy. FIGS. 2A-2B illustrate a more detailed view of the retail products 200 illustrated in FIGS. 1A-1B. Although a single retail product 200 is illustrated in FIGS. 2A-2B, each of the retail products 200 displayed at the product display assembly 102 may comprise a shape-memory alloy forming at least one of a logo, a brand name or other product identifier, an image, pricing information, and the like. Notably, as described herein, a "retail product" refers to both a retail product, itself, as well as the packaging. For example, a retail product includes a package containing loose tobacco as well as the tobacco itself. However, for the purposes of this disclosure, only the packaging of the retail product will be described in any detail.

The retail product 200 is configured to be advertised and sold in a bricks and mortar retail establishment, and be displayed on a product display assembly, like assembly 102 in FIGS. 1A-1B. The retail product 200 is also configured to be displayed without a designated assembly, such as, for example, on a shelf of the bricks and mortar retail establishment.

The packaging of the retail product 200 is configured, in some embodiments, to include a logo 202 comprising a shape-memory alloy configured to change from a first shape to a second shape in response to heat produced from electrical current provided by a power source. The power source, in some embodiments, is a different power source than that which powers the logo 112 described with regard to FIGS. 1A-1B. However, the power source, in other embodiments, is a same power source as that which powers the logo 112.

In some embodiments, the retail product 200 comprises a container having a bottom portion 204, which acts as a receptacle, and a top portion 206 which acts as a lid. Depending on a disposition of the retail product 200 in a display assembly, the logo 202, or other advertising/marketing indicia, may be disposed in various locations relative to a surface of the retail product 200. For example, where the retail product 200 is displayed in a product display assembly, like the product display assembly 102 illustrated in FIGS. 1A-1B, such that circumferential side surfaces of the bottom portion 204 and the top portion 206 are on display, the logo 202 is disposed on a circumferential side surface of the bottom portion 204 and/or the top portion 206. In another example, and as illustrated in FIGS. 2A-2B, where the retail product 200 is displayed in a product display assembly, like the product display assembly 102, such that a top surface 208 of the lid is viewable by the consumer when the product 200 is on display, the logo 202 is disposed on the top surface 208. Regardless, the retail product is displayed such that the logo 202 is most clearly viewable by the consumer when approaching or near the retail product 200, as displayed. In other words, the product display assembly 102 may be configured to support the retail product 200 such that the logo 202 is exposed, and thereby visible.

Accordingly, and in reference to FIG. 2A, the top surface 208 displays the logo 202 in a first shape, where the logo 202 comprises a shape-memory alloy, such as nickel-titanium. Notably, the shape-memory alloy of the logo 202 comprises the same properties, characteristics, etc., as that described above in reference to the shape-memory alloy in FIGS. 1A-1B. In the first shape, the logo 202 substantially matches the shape of surrounding structure of the top surface 208. More particularly, the logo 202 appears to be substantially integrated with or is recessed within a surrounding portion of the top surface 208 when viewed by a consumer from a front or side of the top surface 208. For example, where the top surface 208 is substantially planar, the logo 202 is substantially coplanar with the top surface 208 such that the logo 202 does not protrude from the top surface 208. In another example, where the top surface 208 is substantially curved or otherwise contoured, the logo 202 comprises curvature that corresponds to the curvature of the top surface 208 such that the logo 202 does not protrude from the top surface 208 at any point along the curvature of the top surface 208. In a still further example, only one or more portions of the logo 202 do not protrude from the top surface 208, while other portions of the logo 202 do protrude from the top surface 208, when the logo 202 is in the first shape.

Conversely, and in reference to FIG. 2B, the top surface 208 of the top portion 206 displays the logo 202 in a second shape. In the second shape, the logo 202 is substantially raised or projects from the surrounding structure of the top surface 208. More particularly, the logo 202 protrudes or extends outwardly from a surrounding portion of the top surface 208 when viewed by a consumer from a front or side of the top surface 208. For example, where the top surface 208 is substantially planar, the logo 202 is substantially non-coplanar with the top surface 208 such that the logo 202 is raised from the planar top surface 208. In another example, where the top surface 208 is substantially curved or otherwise contoured, the logo 202 protrudes from the top surface 208 at any point along the curvature of the top surface 208. In a still further example, only one or more portions of the logo 202 protrude from the top surface 208, while other portions of the logo 202 do not protrude from the top surface 208, when the logo 202 is in the second shape.

Thus, in embodiments in which the retail product 200 includes the logo 202 comprising a shape-memory alloy, the logo 202 is configured to attract attention to the retail product 200 by changing from the first shape to the second shape.

In some embodiments the entirety of the component including the logo (e.g., the top portion) may comprise the shape-memory alloy. This configuration may allow for simplified construction of the component including the shape-memory alloy. In other embodiments the logo may comprise a shape-memory alloy, whereas a remainder of the component at which the logo is located may comprise one or more materials other than the shape-memory alloy. This configuration may reduce material costs and/or allow for usage of other materials in other portions of the component that may provide desirable properties such as venting. Similarly, in embodiments of the product display assembly including a logo configured to change shape, the entirety of the component including the logo may comprise the shape-memory alloy, or a portion thereof at which the logo is positioned.

Figure 3:
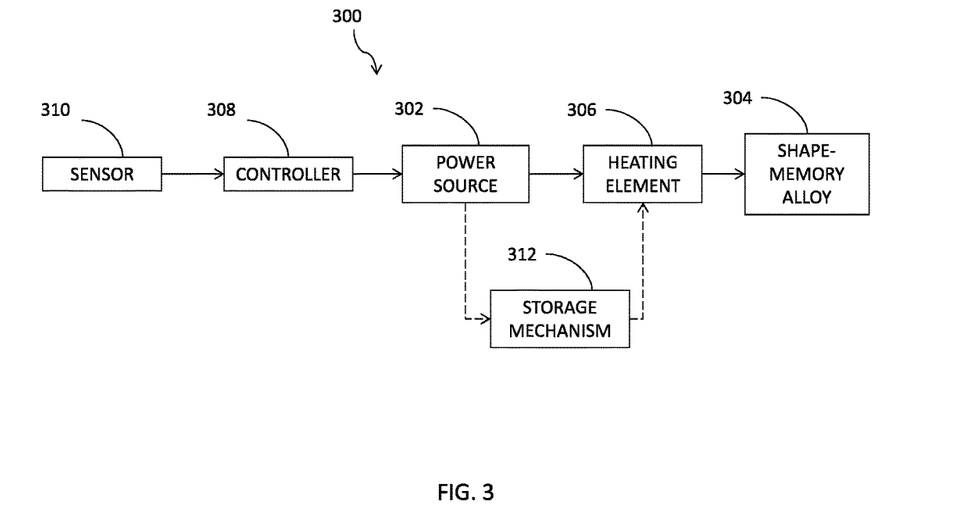
FIG. 3 schematically illustrates components of the product display system for causing a shape-memory alloy of a product display assembly and/or a retail product to change shape.

Referring now to FIG. 3, an exemplary schematic illustrating components, generally designated 300, of one or both of the product display assembly 102 and the retail product 200 is provided. The components 300 include a power source 302 configured to output electrical current to heat a shape-memory alloy in either one or both of the product display assembly 102 and the retail product 200 (FIGS. 1A-2B). As illustrated in FIG. 3, the power source 302 is configured to output current to heat a shape-memory alloy (e.g., the logo 112, the logo 202, etc.), generically designated 304 by way of a heating element 306. In this regard, the power source 302 is hardwired or otherwise physically connected to a heating element 306, such that the heating element 306 receives the electrical current produced by the power source 302 and generates heat in response thereto. By way of example, the power source 302 is configured to directly supply the electrical current to multiple heating elements 306 individually associated with each of the retail products, as well as at least one associated with the product display assembly (e.g., FIGS. 1A-2B). Although the heating element 306 is indicated as being a separate element as compared to the shape memory alloy 304, in other embodiments the shape memory alloy may itself produce the heat when electrical current is applied thereto from the power source 302. In this regard, the shape memory alloy 304 may produce heat as a result of joule heating when electrical current is applied therethrough.

In some embodiments, the power source 302 comprises an electrical cord configured to plug into an electrical wall outlet. In embodiments in which the heating element(s) 306 are powered by direct current (DC), the power source 302 further comprises an alternating current (AC) to DC power inverter. Accordingly, in embodiments in which the power source 302 comprises an electrical cord configured to receive power, the product display system 100 is positioned proximate an electrical wall outlet.

However, in other embodiments, it is desirable to power the product display system 100 without an electrical cord connected to an electrical outlet. In this regard, electrical outlets may not be readily available in retail establishments at locations at which the product display system 100 is positioned. Accordingly, in another embodiment, the power source 302 comprises a battery. The battery is replaceable, rechargeable, or configured to last a lifetime of the product display assembly 102 and/or the retail product 200.

Further, in an alternative embodiment, the power source 302 is configured to employ energy harvesting to produce the electrical current. In this embodiment, the power source 302 is configured to receive and convert ambient energy into the electrical current. The ambient energy comes from electric or magnetic fields or radio waves from nearby electrical equipment, light, thermal energy (e.g., heat), or kinetic energy such as vibration or motion.

In this regard, by way of example, FIGS. 1A-1B illustrate a power source for the system 100 that comprises a light-to-power conversion mechanism 114. The light-to-power conversion mechanism 114 is configured to receive light from a light source 116 and output the electrical current, which is hereinafter referred to as the "first electrical current" to either one or both of the logo 112 and the logo 202 (FIGS. 2A-2B). Thus, the light-to-power conversion mechanism 114 comprises a photovoltaic cell, in some exemplary embodiments.

For example, the light-to-power conversion mechanism 114 comprises an amorphous silicon solar cell (a-Si), a biohybrid solar cell, a buried contact solar cell, a cadmium telluride solar cell (CdTe), a concentrated photovoltaic cell (CVP and HCVP), a copper indium gallium selenide solar cell (CI(G)S), a crystalline silicon solar cell (c-Si), a dye-sensitized solar cell (DSSC), a gallium arsenide germanium solar cell (GaAs), a hybrid solar cell, a luminescent solar concentrator cell (LSC), a micromorph solar cell (tandem-cell using a-Si/μc-Si), a monocrystalline solar cell (mono-Si), a multijunction solar cell (MJ), a nanocrystal solar cell, an organic solar cell (OPV), a perovskite solar cell, a photoelectrochemical cell (PEC), a plasmonic solar cell, a plastic solar cell, a polycrystalline solar cell (multi-Si), a polymer solar cell, a quantum dot solar cell, a solid-state solar cell, a thin film solar cell (TFSC), a wafer solar cell, or a wafer-based solar cell (crystalline silicon solar cell). However, the light-to-power conversion mechanism 114 also comprises various other embodiments of solar cells in other embodiments. Note that the term solar cell is used interchangeably herein with the terms photovoltaic cell and photoelectric cell, each of which refers to a solid state electrical device that converts energy from light into electricity (e.g., via the photovoltaic effect).

In some embodiments, the light-to-power conversion mechanism 114 and the remainder of the product display system 100 are located indoors. In this regard, many retail establishments are at least partially enclosed within buildings. Accordingly, the light-to-power conversion mechanism 114 is configured to operate in low-light conditions that exist in such indoor locations. For example, in some embodiments, the light source 116 comprises one or more incandescent light bulbs, compact florescent bulbs, light emitting diodes (LEDs), or any other electrically-powered light source configured to illuminate the retail establishment. However, as may be understood, the light received by the light-to-power conversion mechanism 114 is additionally or alternatively provided by ambient sunlight, which enters the retail establishment through one or more windows, skylights, or openings. Examples of photovoltaic cells configured for operation in low-light conditions are commercially available from ElectricFilm, LLC of Newburyport, Mass. Various other photovoltaic cells are commercially available from SolarWorld Americas of Hillsboro, Oreg.

In other embodiments, the light-to-power conversion mechanism 114 (and/or some or all of the other components of the product display system 100) are located outdoors and configured for direct exposure to sunlight. In this embodiment, the light-to-power conversion mechanism 114 defines a reduced size as compared to embodiments of light-to-power conversion mechanisms configured to produce power from indoor light. Alternatively or additionally, the light-to-power conversion mechanism 114 employs materials that are relatively less efficient, which reduce the cost of the light-to-power conversion mechanism.

As illustrated in FIGS. 1A-1B, in one embodiment, the light-to-power conversion mechanism 114 is positioned at the top of the product display assembly 102. Thereby, a primary surface 114' of the light-to-power conversion mechanism 114 configured to receive light is positioned substantially perpendicular to the light source 116 (e.g., one or more ceiling lights) and relatively close to the light source 116, such that the electricity production efficiency of the light-to-power mechanism 114 is maximized. Further, as a result of being placed at or proximate the top of the product display assembly 102, the light-to-power conversion mechanism 114, which may be relatively fragile and/or expensive, is positioned out of reach and/or out of view of consumers such that damage to the light-to-power conversion mechanism and/or theft of the light-to-power conversion mechanism may be less likely to occur.

Regardless, returning to FIG. 3, in some embodiments the heating element 306 is hardwired to the power source 302 or otherwise physically connected thereto to receive the first electrical current. However, in other embodiments, the heating element 306 is wirelessly connected or otherwise indirectly powered by the power source 302. In this regard, in some embodiments, the shape-memory alloy defining the logo 112 in FIGS. 1A-1B and/or the logo 202 in FIGS. 2A-2B is/are configured to be heated by heat produced by the heating element 306 in response to receipt of the first electrical current from the power source 302.

More particularly, the power source 302 is configured to output an electrical current to the heating element 306 so that the heating element 306 produces heat, in response thereto, to heat the shape-memory alloy forming the logo 112 and/or the logo 202, where the retail product 200 (or the like) is displayed at the assembly, to the austenite start temperature $A_s$. In some instances, a same heating element 306 is configured to heat both the shape-memory alloy of the logo 112 and the logo(s) 202 of the retail products 200. Otherwise, each of the product display assembly 102 and the individual retail products 200 comprises its own heating element 306. FIG. 3 illustrates a single heating element 306; however, depending on the configuration, there may be N number of heating elements 306, where N is an integer greater than zero. The heating element(s) configured to heat the 202 of the retail packages 200 may be included in the retail packages themselves, or provided in the product display assembly 102.

The heating element 306 comprises, in some aspects, an electrical resistor that is configured to receive the first electrical current from the power source 302 and generate heat in response thereto. For example, the heating element 306 comprises conductive heating coils that are associated with the shape-memory alloy. In this example, a conductive heating coil is disposed in the top portion 206 of the retail product 200 and is configured to receive the first electrical current through either a hardwire connection with the power source 302 or a wireless provision of power. Likewise, in this example, a conductive heating coil is disposed in the panel 110, or otherwise proximate to the shape-memory alloy of the logo 112, wherever that may be in the product display assembly 102, such that the conductive heating coil is configured to receive the first electrical current through either a hardwire connection with the power source 302 or a wireless provision of power. Other types of heating elements 306 are also contemplated in this disclosure.

In some embodiments, the heating element 306 is configured to receive the first electrical current from the power source 302 through a hardwire connection. Where a hardwire connection is utilized, in some embodiments, the power source 302 is electrically connected to the heating element 306 associated with the shape-memory alloy of the logo 112 and the heating element 306 associated with the shape-memory alloy of the logo 202 of each retail product 200 so that heat generated by the heating elements heats a respective shape-memory alloy. In this instance, each retail product 200 comprises a physical contact-based mechanism electrically connected with the heating element 306 and the product display assembly 102 comprises a similar physical contact-based mechanism electrically connected with the power source 302 such that when the contact-based mechanisms of each of the retail product 200 and the product display assembly 102 contact one another, an electrical connection is formed therebetween. In some embodiments, the shelves 108 comprise physical contact-based mechanisms only at a front position in each row or column at which the retail product 200 is configured to be viewable. In this instance, only a retail product 200 moved into a front position on the shelf 108 (i.e., only those retail products 200 visible in FIGS. 1A-1B) establishes an electrical connection between its respective heating element 306 and the power source 302. Thereby, electrical current may be directed from the power source 302, which may be separate from the retail product 200 (e.g., included in the product display assembly 102), to the retail product.

In other instances, the power source 302 is electrically connected via a hardwire connection to the heating element 306 of only one of the logo 112 and the logo 202 of each retail product 200, such that heat generated by the heating element 306 heats only the shape-memory alloy associated with the heating element electrically coupled to the power source. In this instance, the other of the two shape-memory alloys comprises an alternate power source. For example, the power source 302 is electrically connected only with the heating element 306 associated with the shape-memory alloy of the logo 112. In this example, each retail product 200 comprises its own portable power source (e.g., a battery and/or a capacitor), which may be retained within the top portion 206 along with an individual heating element 306.

In some embodiments, the heating element 306 is configured to receive the first electrical current from the power source 302 through a wireless connection. Such a connection is advantageous, as it additionally or alternatively, allows for removal of the products 200 from the product display assembly 102 without requiring decoupling of a physical electrical connection between the product 200 and the power source 302. In this regard, in some embodiments, it is desirable to wirelessly provide power to the heating element(s) 306. Note that while usage of wireless power transmission is discussed below in terms of usage with the heating element 306 associated with each individual one of the products 200, in other embodiments, wireless power transmission is additionally or alternatively employed to supply power to the heating element 306 at the product display assembly 102, which may be a different or a same heating element as that associated with the products 200.

In order to wirelessly provide power, the power source 302 includes, in some embodiments, a wireless power transmitter (not shown) and the product 200 includes a wireless power receiver (not shown). The wireless power transmitter is configured to receive the first electrical current (e.g., current from an electrical plug or a solar panel, as described above). As discussed below in detail, the wireless power transmitter cooperates with the wireless power receiver to produce a second electrical current. Thereby, the heating element 306 is configured to receive the second electrical current from the wireless power receiver and produce heat that heats the shape-memory alloy of the logo 202 to the austenite start temperature $A_s$ up to the austenite finish temperature $A_f$ in response thereto.

In this regard, the wireless power transmitter and the wireless power receiver cooperate to wirelessly produce the second electrical current. Note that the term wireless, as used herein with respect to wireless power transmission, refers to an arrangement in which the wireless power receiver produces and outputs the second electrical current in cooperation with the wireless power transmitter, without receiving the second electrical current via a physical contact-based mechanism. In other words, electrical current is not directly transferred from the wireless power transmitter to the wireless power receiver via a wire or other solid-state circuit, such that physical contact between the wireless power transmitter and the wireless power receiver is not required. Rather, the wireless power transmitter employs the first electrical current to indirectly cause the wireless power receiver to produce the second electrical current that is directly or indirectly transmitted to the heating element 306. Thereby, as a result of no direct, physical electrical connection being formed between the wireless power transmitter and the wireless power receiver, the second electrical current differs in one or more respects (e.g., voltage or current) as compared to the first electrical current. Additional description with regard to wireless power transmission mechanisms and techniques is provided in U.S. patent application Ser. No. 14/725,725, filed May 29, 2015, to Rogers, which is incorporated herein by reference in its entirety.

Regardless of the particular power transmission mechanism and technique employed, in some embodiments, the wireless power receiver outputs the second electrical current when the first electrical current is directed to the wireless power transmitter. In some embodiments, the wireless power transmitter receives the first electrical current directly from the power source 302, (e.g., the light-to-power conversion mechanism 114, FIGS. 1A-1B) such that the wireless power transmitter operates substantially continuously when the first electrical current is sufficient for operation of the wireless power transmitter. However, in some instances, the first electrical current produced by the power source is insufficient to allow for continuous cooperative operation of the wireless power transmitter and the wireless power receiver to produce the second electrical current sufficient for operation of the heating element 306. Further, in some embodiments, it is preferable to discontinuously operate the heating element 306, such that the transformation of the shape-memory alloy between the first and second shape, where it is employed as a logo, text, etc., occurs repeatedly to attract consumer attention. In this regard, dynamic transformation of the shape-memory alloy may more successfully gain consumer attention due to the change in shape of the shape-memory alloy being more easily perceptible.

Accordingly, in some embodiments, the product display system 100 further comprises certain mechanisms described below that allow for operation of the heating element 306 to produce heat to dynamically transform the shape of the shape-memory alloy of the product display assembly and/or the retail product in a controlled manner. In some embodiments, each of the products 200 includes such mechanisms that control the heating element 306 or otherwise provide for a discontinuous change in shape of the shape-memory alloy. However, as noted above, some or all of the products 200 may be configured for sale, and such mechanisms provide no useful purpose post-sale to a consumer. Further, such mechanisms are operable with a plurality of heating elements 306, such that inclusion in each of the products 200 is not necessary. Accordingly, in some embodiments, it is desirable to locate as many of the components of the product display system 100 as possible in the product display assembly 102, rather than in each of the products 200. Thereby, the total costs associated with the product display system 100 may be reduced, and relatively fewer components may be included in the products 200 so as to reduce the costs and size of the products.

In this regard, in some embodiments, the product display assembly 102 further comprises a control circuit. FIG. 3 illustrates one embodiment of a control circuit—a controller 308. The controller 308 is configured to selectively control heating of the shape-memory alloy by controlling output of the first electrical current directly to the heating element 306 in a wired connection or to indirectly to the heating element 306 by way of the wireless power transmitter in a wireless connection. For example, the controller 308 is configured to direct the first electrical current to the heating element 306 at one or more predetermined intervals or at one or more predetermined times of the day, which may be within typical retail establishment hours. Further, in some embodiments, the controller 308 controls a duration of time during which the first electrical current is directed to the heating element 306 in each instance in which the controller 308 directs the first electrical current to the heating element 306. Where a wireless connection is established, the timing and duration of time that the controller 308 controls the wireless power transmitter to transmit a first electrical current to the wireless power receiver, results in the output of the second electrical current from the wireless power receiver being indirectly controlled.

In some embodiments, the controller 308 is configured to control the output of the first electrical current to the wireless power transmitter or to the one or more heating elements 306 via a wired connection in additional or alternative manners. In this regard, in some embodiments the controller 308 comprises a sensor 310. The sensor 310 is configured to detect a human presence. For example, the sensor 310 comprises a proximity sensor configured to detect proximity of a human, a motion sensor configured to detect motion, or a sound sensor configured to detect sound. The controller 308 is configured, in some embodiments, to cause heating of the shape-memory alloy in response to detection of the human presence by the sensor 310, as described by way of example above. Example embodiments of motion sensors that may be employed in the system of the present disclosure are provided in U.S. patent application Ser. No. 14/725,725, filed May 29, 2015, to Rogers, which is incorporated herein by reference in its entirety.

Accordingly, regardless of whether or not the sensor 310 is employed, and regardless of the type of the sensor, the controller 308 is configured to direct the first electrical current to the heating element 306 either via a wireless or hardwired connection under one or more circumstances. In order to facilitate controlled output of the first electrical current to the heating element 306, in some embodiments the product display assembly 102 further comprises a current storage mechanism 312. The current storage mechanism 312 is configured to store the first electrical current. In this regard, in some embodiments, the current storage mechanism 312 comprises a battery (e.g., a rechargeable battery) and/or a capacitor (e.g., a supercapacitor). Thereby, the current storage mechanism 312 outputs the first electrical current to the heating mechanism 306 via either a wired connection or a wireless connection when directed to do so by the controller 308. Thus, for example, the first electrical current is directed from the current storage mechanism 312 to the heating element 306 by the controller 308 in response to detection of a human presence by the sensor 310, or once a threshold voltage or current is reached at the current storage mechanism.

In another example, the first electrical current is directed from the current storage mechanism 312 to a wireless power transmitter by the controller 308 in a similar manner. A wireless power receiver is then configured to receive the first electrical current from the current storage mechanism 312 and output a second electrical current.

Regardless of the power transmission method implemented, the heating element 306 is configured to receive the second electrical current from the wireless power receiver and begin to generate heat in order to heat the shape-memory alloy. Accordingly, either a wired or wireless power transmission technique may be employed to cause the shape-memory alloy to change from a first shape to a second shape, and vice versa.

Figure 4:
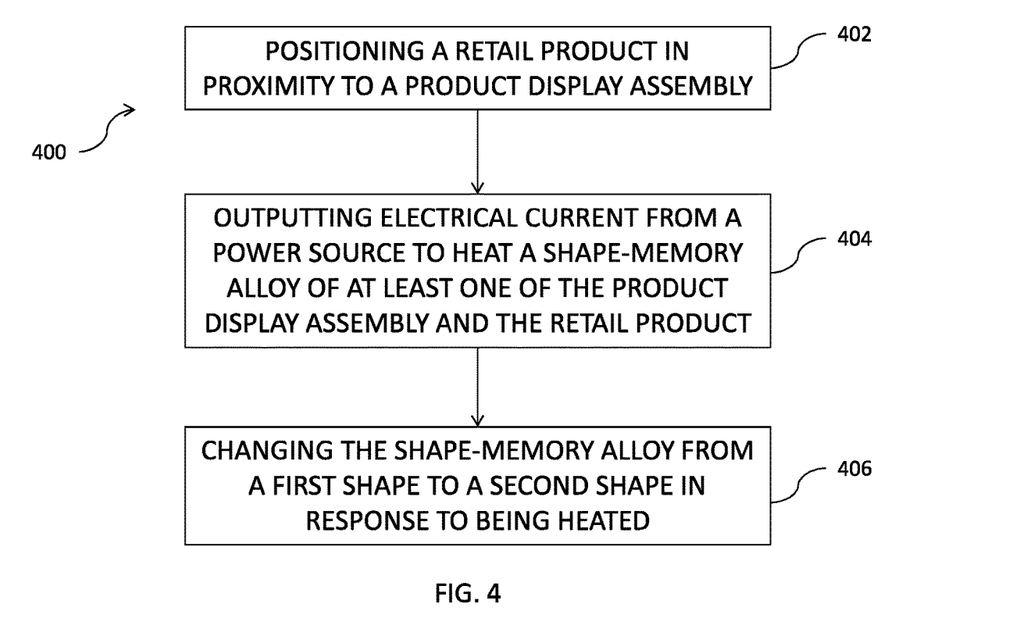
FIG. 4 schematically illustrates a product display method according to an example embodiment of the present disclosure.

A related product display method is also provided. As illustrated in FIG. 4, the method, generally designated 400, comprises positioning a retail product (e.g., retail product 200, FIGS. 2A-2B) in proximity to a product display assembly (e.g., product display assembly 102, FIGS. 1A-1B) at operation 402. Further, the method 400 comprises outputting electrical current from a power source (e.g., power source 302, FIG. 3) to heat a shape-memory alloy (e.g., the shape-memory alloy of the logo 112, FIGS. 1A-1B, or of the logo 202, FIGS. 2A-2B) of at least one of the product display assembly and the retail product at operation 404. The method 400 further comprises changing the shape-memory alloy from a first shape to a second shape in response to being heated at operation 406.

In some embodiments, outputting the electrical current from the power source to heat the shape-memory alloy at operation 404 may include selectively controlling, by a controller, heating of the shape-memory alloy. The shape-memory alloy may include a nickel titanium alloy. The shape-memory alloy, in the first shape, may be substantially coplanar with a surface of at least one of the product display assembly and the retail product and, in the second shape, may be non-coplanar with the surface.

In some embodiments, outputting the electrical current from the power source to heat the shape-memory alloy at operation 404 may include heating, by a heating element of at least one of the product display assembly and the retail product, the shape-memory alloy to an austenite start temperature in response to receipt of electrical current from the power source. Changing the shape-memory alloy from the first shape to the second shape in response to being heated at operation 406 may include changing, of the shape-memory alloy, to the second shape from the first shape in response to being heated to a temperature approximately between the austenite start temperature and an austenite finish temperature. The method may further include returning, of the shape-memory alloy, to the first shape from the second shape in response to cooling to at least a martensite start temperature.

Many modifications and other aspects of the disclosure set forth herein will come to mind to one skilled in the art to which the disclosure pertains having the benefit of the teachings presented in the foregoing descriptions and the associated drawings. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. A product display system, comprising:
a product display assembly comprising a surface;
a retail product positioned in proximity to the product display assembly, the retail product comprising a surface;
a power source configured to output electrical current; and
at least one of the product display assembly and the retail product being arranged in communication with the power source to receive the electrical current therefrom and comprising a shape-memory alloy portion recessed into a portion of the surface of the product display assembly or the retail product such that the portion of the surface extends about the shape-memory alloy portion, the shape-memory alloy portion being configured to change from a first shape, substantially continuous with the portion of the surface extending about the shape-memory alloy portion, to a second shape, discontinuous with the portion of the surface of the product display assembly or the retail product, in response to heat produced from electrical current provided thereto by the power source, wherein at least one of the first shape and the second shape of the shape-memory alloy defines a brand name, a logo, a text, a graphic, or a combination thereof.

2. The product display system of claim 1, wherein the power source comprises a light-to-power conversion mechanism configured to receive light and output electrical current.

3. The product display system of claim 2, further comprising a current storage mechanism configured to store electrical current received from the light-to-power mechanism.

4. The product display system of claim 1, wherein the power source comprises a battery.

5. The product display system of claim 1, further comprising a controller configured to selectively control heating of the shape-memory alloy.

6. The product display system of claim 5, further comprising a sensor configured to detect a human presence, the controller being configured to cause heating of the shape-memory alloy in response to detection of the human presence.

7. The product display system of claim 6, wherein the sensor is configured to detect one or more of motion and sound.

8. The product display system of claim 1, wherein the shape-memory alloy comprises a nickel titanium (NiTi) alloy.

9. The product display system of claim 1, wherein at least one of the product display assembly and the retail product comprises a heating element configured to receive electrical current from the power source and to heat the shape-memory alloy to at least an austenite start temperature in response thereto.

10. The product display system of claim 9, wherein the shape-memory alloy is configured to change to the second shape from the first shape in response to being heated to a temperature approximately between the austenite start temperature and an austenite finish temperature.

11. The product display system of claim 9, wherein the shape-memory alloy is configured to return to the first shape from the second shape in response to cooling to at least a martensite start temperature.

12. A product display method comprising:
positioning a retail product comprising a surface in proximity to a product display assembly comprising a surface; and
outputting electrical current from a power source arranged in communication with the product display assembly or the retail product so as to heat a shape-memory alloy portion recessed into a portion of the surface of the product display assembly or the retail product such that the portion of the surface extends about the shape-memory alloy portion;
and so as to change the shape-memory alloy portion from a first shape substantially continuous with the portion of the surface extending about the shape-memory alloy portion of the product display assembly or the retail product, to a second shape, discontinuous with the portion of the surface of the product display assembly or the retail product, in response to heat produced from the electrical current provided thereto by the power source, wherein at least one of the first shape and the second shape of the shape-memory alloy defines a brand name, a logo, a text, a graphic, or a combination thereof.

13. The product display method of claim 12, wherein outputting the electrical current from the power source to heat the shape-memory alloy comprises selectively controlling, by a controller, heating of the shape-memory alloy.

14. The product display method of claim 12, wherein the shape-memory alloy comprises a nickel titanium (NiTi) alloy.

15. The product display method of claim 12, wherein outputting the electrical current from the power source to heat the shape-memory alloy comprises heating, by a heating element of at least one of the product display assembly and the retail product, the shape-memory alloy to an austenite start temperature in response to receipt of electrical current from the power source.

16. The product display method of claim 15, wherein changing the shape-memory alloy from the first shape to the second shape in response to being heated comprises changing, of the shape-memory alloy, to the second shape from the first shape in response to being heated to a temperature approximately between the austenite start temperature and an austenite finish temperature.

17. The product display method of claim 15, further comprising returning, of the shape-memory alloy, to the first shape from the second shape in response to cooling to at least a martensite start temperature.

* * * * *